(12) United States Patent
Brinkman et al.

(10) Patent No.: US 8,997,471 B2
(45) Date of Patent: Apr. 7, 2015

(54) HYDRAULIC SYSTEM HAVING DUAL MANIFOLDS

(71) Applicant: Caterpillar Inc., Peoria, IL (US)

(72) Inventors: Jason Brinkman, Peoria, IL (US); Shaun Currier, Naperville, IL (US); Eric Jakubiak, Aurora, IL (US)

(73) Assignee: Caterpillar Inc., Peoria, IL (US)

( * ) Notice: Subject to any disclaimer, the term of this patent is extended or adjusted under 35 U.S.C. 154(b) by 235 days.

(21) Appl. No.: 13/691,422

(22) Filed: Nov. 30, 2012

(65) Prior Publication Data

US 2014/0150870 A1 Jun. 5, 2014

(51) Int. Cl.
*F16L 41/02* (2006.01)
*F16L 41/03* (2006.01)
*E02F 9/08* (2006.01)

(52) U.S. Cl.
CPC .............. *F16L 41/03* (2013.01); *E02F 9/0875* (2013.01)

(58) Field of Classification Search
USPC ............. 60/325, 327, 456, 469, 494; 91/449, 91/471, DIG. 2; 137/561 R, 561 A, 599.01; 285/125.1, 133.11
See application file for complete search history.

(56) References Cited

U.S. PATENT DOCUMENTS

| | | | | |
|---|---|---|---|---|
| 895,735 | A * | 8/1908 | Felkner | 285/125.1 |
| 1,737,557 | A * | 12/1929 | Beach | 285/125.1 |
| 1,990,052 | A * | 2/1935 | Sosa | 91/449 |
| 2,158,716 | A | 5/1939 | Bergdoll | |
| 2,163,591 | A * | 6/1939 | Deverall | 137/561 A |
| 2,464,283 | A * | 3/1949 | Adams | 137/599.01 |
| 2,982,101 | A * | 5/1961 | Hackett et al. | 60/456 |
| 3,167,916 | A * | 2/1965 | Schroeder | 60/456 |
| 3,262,466 | A | 7/1966 | Adams et al. | |
| 3,589,387 | A | 6/1971 | Raymond | |
| 5,085,468 | A * | 2/1992 | Billotte | 60/456 |
| 5,317,872 | A * | 6/1994 | Ingvast | 60/494 |
| 5,975,134 | A | 11/1999 | Schwelm | |
| 6,029,445 | A * | 2/2000 | Lech | 60/494 |
| 6,089,252 | A | 7/2000 | Braun | |

(Continued)

FOREIGN PATENT DOCUMENTS

JP  60 078176  5/1985
JP  07 208401  8/1995

OTHER PUBLICATIONS

Pending U.S. Patent Application, entitled "Tank Breather Assembly and Mounting Configuration,", filed Nov. 30, 2012.

(Continued)

*Primary Examiner* — John Rivell
(74) *Attorney, Agent, or Firm* — Finnegan, Henderson, Farabow, Garrett & Dunner, LLP

(57) ABSTRACT

A hydraulic system for a machine is disclosed. The hydraulic system may include a fluid tank, a first manifold, a valve body, a second manifold, and a plurality of conduits. The first manifold may be operatively attached to the fluid tank and have at least two inlets and at least one outlet in fluid communication with the fluid tank. The number of the at least one outlet may be less than the number of the at least two inlets. The second manifold may be operatively attached to the valve body and have at least one inlet in fluid communication with the valve body and at least two outlets. The number of the at least one inlet may be less than the number of the at least two outlets. The plurality of conduits may fluidly connect the at least two inlets of the first manifold and the at least two outlets of the second manifold.

20 Claims, 3 Drawing Sheets

(56) References Cited

U.S. PATENT DOCUMENTS

| | | | |
|---|---|---|---|
| 6,315,330 B1 * | 11/2001 | Byerly | 285/125.1 |
| 6,408,876 B1 | 6/2002 | Nishimura et al. | |
| 6,418,955 B2 | 7/2002 | Lewis et al. | |
| 6,550,815 B2 * | 4/2003 | Zitkowic et al. | 285/125.1 |
| 6,845,614 B2 * | 1/2005 | Stahlman | 60/456 |
| 7,849,675 B2 * | 12/2010 | Ripper et al. | 137/599.01 |
| 7,886,768 B2 | 2/2011 | Kobayashi et al. | |
| 2003/0146661 A1 | 8/2003 | Hatch | |
| 2009/0084450 A1 * | 4/2009 | Shade | 137/599.01 |

OTHER PUBLICATIONS

Pending U.S. Patent Application, entitled "Tank Splashguard with Multi-Tiered Labyrinth,", filed Nov. 30, 2012.

* cited by examiner

HYDRAULIC SYSTEM HAVING DUAL MANIFOLDS

TECHNICAL FIELD

The present disclosure relates generally to a hydraulic system and, more particularly, to a hydraulic system having dual manifolds.

BACKGROUND

Machines such as a wheel loaders, scrapers, track-type tractors, on and off-highway haul trucks, motor graders, and other heavy equipment generally include hydraulic systems that facilitate different operations of the machines. Typical hydraulic systems include hydro-mechanical actuators known as cylinders. The cylinders are usually supplied with hydraulic fluid from a fluid tank mounted on the machine. The hydraulic fluid travels through a series of conduits, connections, channels, and valves from the fluid tank to the cylinders and from the cylinders back to the fluid tank.

In some situations, it may be possible for a cylinder to move faster than the rate at which hydraulic fluid can be supplied to the cylinder to move the cylinder. For example, the cylinder can be connected to a tool that, when heavily loaded, causes the cylinder to retract faster than would normally be caused by the hydraulic fluid. In these situations, the rapid travel of the cylinder can create air voids in the cylinder at one end. Air voids can result in damaging pressure extremes and oscillations that can reduce the durability, reliability, and efficiency of the machine.

Reducing air voids in hydraulic systems is often accomplished by creating resistance to the hydraulic fluid draining from the cylinder (i.e., backpressure), by restricting the flow of hydraulic fluid. This can be achieved by placing specialized restrictive orifices at discrete locations within the hydraulic system. The generated backpressure can be used to operate a valve that redirects oil to the end of the cylinder containing air voids. An exemplary system utilizing restrictive orifices in this manner is described in U.S. Pat. No. 3,589,387 that issued to Raymond on Jun. 29, 1971.

Although utilizing restrictive orifices may help create desired backpressure, it may be less than optimal. This is because the use of restrictive orifices may necessitate mounting where it is inconvenient to do so. It may also require breaking continuous portions of the conduits, connections, and channels carrying the hydraulic fluid into multiple sections to provide a location for the restrictive orifice. Additionally, rather than facilitating a gradual pressure drop across the hydraulic system, the use of restrictive orifices may induce a sharp pressure drop at a discrete location (i.e., the location of the restrictive orifice). This sharp pressure drop may result in an elevated release of energy and heat over a short distance, which can overheat the surrounding area and the hydraulic fluid.

The hydraulic system of the present disclosure solves one or more of the problems set forth above and/or other problems in the art.

SUMMARY

In one aspect, the present disclosure is directed to a hydraulic system. The hydraulic system may include a fluid tank, a first manifold, a valve body, a second manifold, and a plurality of conduits. The first manifold may be operatively attached to the fluid tank and have at least two inlets and at least one outlet in fluid communication with the fluid tank. The number of the at least one outlet may be less than the number of the at least two inlets. The second manifold may be operatively attached to the valve body and have at least one inlet in fluid communication with the valve body and at least two outlets. The number of the at least one inlet may be less than the number of the at least two outlets. The plurality of conduits may fluidly connect the at least two inlets of the first manifold to the at least two outlets of the second manifold.

In another aspect, the present disclosure may be directed to a method for creating backpressure for a hydraulic system. The method may include drawing fluid from a fluid tank, pressurizing the fluid, and directing the pressurized fluid through a valve body to a hydraulic actuator. The method may also include directing at least one flow of the pressurized fluid from the valve body into a first manifold, splitting the pressurized fluid into at least two flows in the first manifold, and combining the at least two flows into at least one flow in a second manifold. The method may further include directing the at least one flow of the second manifold into the fluid tank.

DETAILED DESCRIPTION

Figure 1:
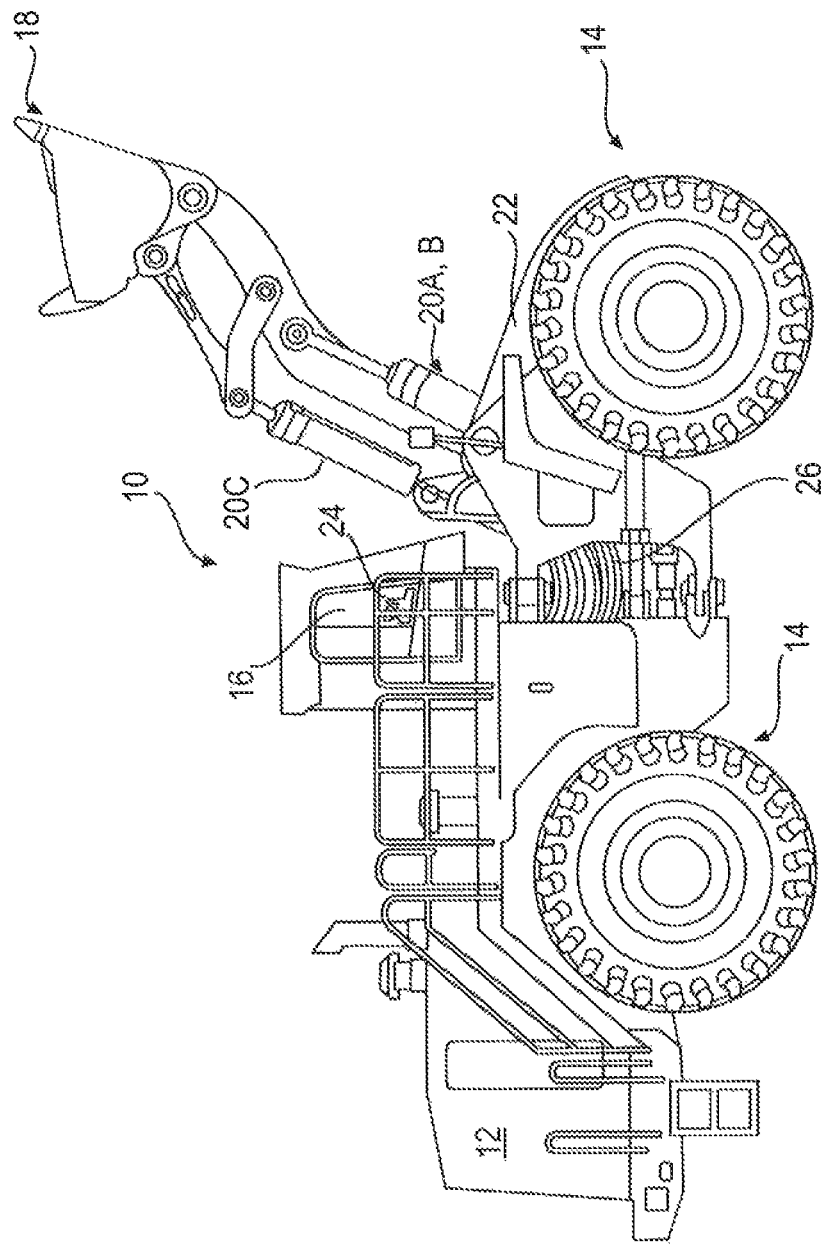
FIG. 1 is a diagrammatic illustration of an exemplary disclosed machine.

FIG. 1 illustrates an exemplary embodiment of a machine 10 having multiple systems and components that cooperate to accomplish a task. Machine 10 may be a mobile or stationary machine that performs some type of operation associated with an industry such as mining, construction, farming, transportation, power generation, or any other industry known in the art. For example, machine 10 may embody an earth moving machine such as a wheel loader, a tractor, a scraper, a haul truck, a backhoe, a motor grader, or any other suitable operation-performing machine. Machine 10 may alternatively embody a generator set, a pump, or another stationary machine. In the exemplary embodiment shown in FIG. 1, machine 10 is a wheel loader.

Machine 10 may include a power source 12, one or more traction devices 14, an operator cabin 16, a work tool 18, and one or more hydraulic actuators 20a-c connecting work tool 18 to a frame 22 of machine 10. Power source 12 may embody an engine such as, for example, a diesel engine, a gasoline engine, a gaseous fuel-powered engine such as a natural gas engine, or any other type of engine apparent to one skilled in the art. Power source 12 may alternatively embody a non-combustion source of power such as a fuel cell, a power storage device, an electric motor, or other similar mechanism. Power source 12 may be operatively connected to drive traction devices 14, thereby propelling machine 10.

Traction device 14 may include one or more wheels located on each side of machine 10 (only one side shown) and configured to allow translational motion of machine 10. Alternatively, traction devices 14 may include tracks, belts or other traction devices known in the art. It is contemplated that any combination of the wheels on machine 10 may be driven and/or steered.

Operator cabin 16 may include devices configured to receive input from a machine operator indicative of a desired machine steering, travel, and/or work tool maneuver. Specifically, operator cabin 16 may include one or more operator interface devices 24 embodied as steering wheels, single or multi-axis joysticks, or other known input devices located proximal to an operator seat. Operator interface devices 24 may be proportional-type controllers configured to move machine 10 or work tool 18 by producing steering, position, and/or velocity control signals that are indicative of a desired machine or work tool maneuver. It is contemplated that operator cabin 16 may be located on machine 10 or remote from machine 10 and connected by way of mechanical, hydraulic, pneumatic, electrical, or wireless links.

Numerous different work tools 18 may be attachable to a single machine 10 and controllable via operator interface devices 24. Work tool 18 may include any device used to perform a particular task such as, for example, a bucket, a fork arrangement, a blade, a shovel, an auger, a ripper, a dump bed, a broom, a snow blower, a propelling device, a cutting device, a grasping device, or any other suitable task-performing device known in the art. Although connected in the disclosed embodiment of FIG. 1 to lift and tilt relative to machine 10, work tool 18 may alternatively or additionally rotate, slide, swing, or move in any other manner known in the art.

Hydraulic actuators 20a-c may include fluid cylinders that connect work tool 18 to frame 22 via a direct pivot, a linkage system with hydraulic actuators 20a-c forming members in the linkage system, or in any other appropriate manner. It is contemplated that hydraulic actuators other than fluid cylinders may alternatively be implemented within hydraulic system 26, if desired. In the disclosed embodiment, hydraulic actuators 20a,b embody lift cylinders that extend to lift work tool 18 away from a ground surface or retract to lower work tool 18 back toward the ground surface, and hydraulic actuator 20c embodies a tilt cylinder that extends to tilt work tool 18 downward toward the ground surface or retracts to tilt work tool 18 backward away from the ground surface.

Each of hydraulic actuators 20a-c may include a tube and a piston assembly disposed within the tube. One of the tubes and the piston assembly may be pivotally connected to frame 22, while the other of the tubes and the piston assembly may be pivotally connected to work tool 18. It is contemplated that the tubes and/or the piston assembly may alternatively be fixedly connected to either frame 22 or work tool 18. Each of hydraulic actuators 20a-c may include two chambers (e.g., a head-end chamber and a rod-end chamber) separated by the piston assembly. The chambers may be selectively supplied with pressurized fluid from a primary source 30 and selectively connected with a tank 28 to cause the piston assembly to displace within the tube, thereby changing the effective length of hydraulic actuators 20a-c. The extension and retraction of hydraulic actuators 20a-c may assist in moving work tool 18.

Figure 2:
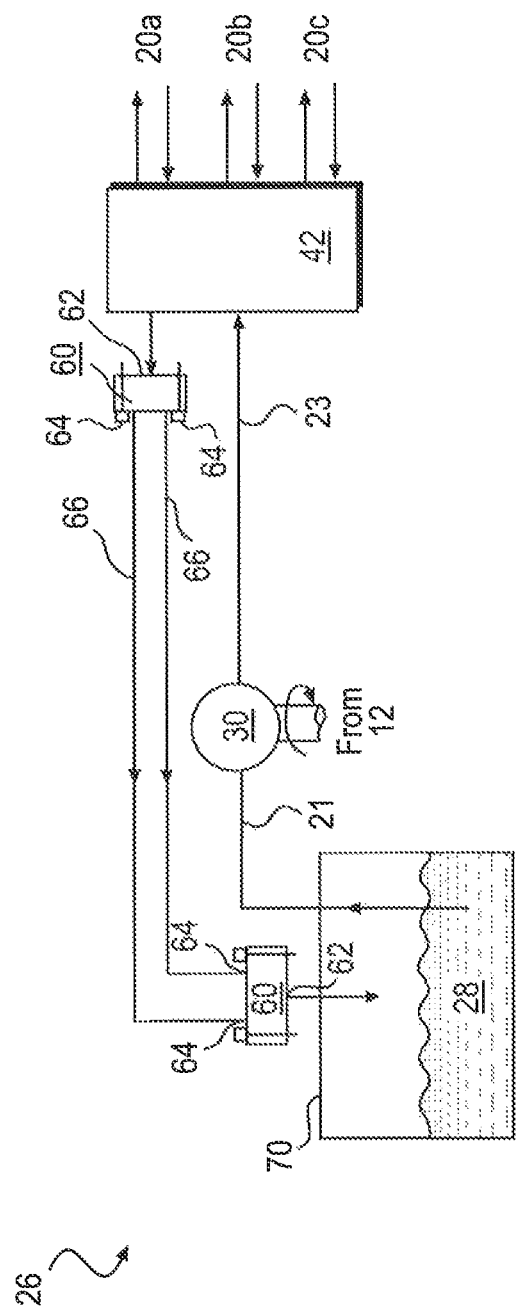
FIG. 2 is a pictorial illustration of an exemplary disclosed hydraulic system that may be used in conjunction with the machine of FIG. 1.

As shown in FIG. 2, machine 10 may include a hydraulic system 26 having a plurality of fluid components that cooperate to move work tool 18 via hydraulic actuators 20a-c (referring to FIG. 1). Specifically, hydraulic system 26 may include tank 28, primary source 30, hydraulic actuators 20a-c (referring to FIG. 1), and associated components that connect hydraulic actuators 20a-c, tank 28, and primary source 30 together.

Tank 28 may constitute a reservoir configured to hold a supply of fluid. The fluid may include, for example, a dedicated hydraulic oil, an engine lubrication oil, a transmission lubrication oil, or any other fluid known in the art. One or more hydraulic systems within machine 10 may draw fluid from and return fluid to tank 28. It is also contemplated that hydraulic system 26 may be connected to multiple separate fluid tanks. In the disclosed embodiment, tank 28 is disposed above traction devices 14 near power source 12.

Primary source 30 may be operatively connected to and driven by power source 12, for example, via a countershaft (not shown), a belt (not shown), an electrical circuit (not shown), or in any other suitable manner such that an output rotation of power source 12 results in a pumping action of primary source 30. Alternatively, primary source 30 may be indirectly connected to power source 12 via a torque converter, a gear box, or in any other manner known in the art.

Primary source 30 may be configured to produce a flow of fluid at a particular discharge pressure, and therefore may consume a portion of the available power produced by power source 12. Primary source 30 may be connected to pressurize fluid to a predetermined level and may embody, for example, a fixed or variable displacement pump, a variable flow pump, or any other device for pressurizing a flow of fluid known in the art. In the disclosed embodiment, primary source 30 is a variable flow pump. Primary source 30 may connect to tank 28 via a tank passage 21.

The connecting components described above may include, among other things, a valve body 42 that directs pressurized fluid from primary source 30 to hydraulic actuators 20a-c, and from hydraulic actuators 20a-c to tank 28. Primary source 30 may connect to valve body 42 via a supply passage 23.

Valve body 42 may have at least one valve (not shown) associated with hydraulic actuator 20a, at least one valve (not shown) associated with hydraulic actuator 20b, and at least one valve (not shown) associated with hydraulic actuator 20c. The valves may be moveable to connect high pressure hydraulic fluid from primary source 30 to a first chamber of hydraulic actuators 20a-c, and to drain fluid from a second chamber of hydraulic actuators 20a-c to tank 28. It is contemplated that one valve may be associated with each of the head- and rod-end chambers of each of hydraulic actuators 20a-c for the supplying and draining of hydraulic fluid. It is also contemplated that a single valve may perform all operations associated with a particular hydraulic actuator 20a-c. It is further contemplated that other configurations may also be possible.

Valve body 42 may connect to tank 28 via dual (i.e., two) manifolds 60 and a pair of parallel fluid return conduits 66 extending between each of manifolds 60. One of conduits 66 may be substantially identical to the other of conduits 66. A first of manifolds 60 may be attached to a wall 70 of tank 28, for example, by way of bolts. Manifold 60 may be a generally rectangular block including at least one opening 62 on a surface facing tank 28 and at least two openings 64 on an opposing surface oriented away from tank 28. Opening 62 may generally be concentric with one of openings 64. Openings 64 may be in general alignment with each other along a length direction of manifold 60. In the disclosed embodiment, manifold 60 includes dual openings 64 on a surface oriented away from tank 28. It is contemplated, however, that any number of openings 64 may be included, as desired, as long as the number of openings 64 exceeds the number of openings 62.

Manifold 60 may be in fluid communication with tank 28 via a port (not shown) in tank 28 that is aligned with opening 62. In this configuration, opening 62 may function as an inlet to discharge fluid into tank 28. Dual openings 64 may each engage conduits 66 extending between valve body 42 and tank 28. In this configuration, dual openings 64 may function as inlets to receive fluid from conduits 66. Conduits 66 may each be characterized by a length of about 4-4.5 meters and an inner diameter of about 49-52 millimeters. In the disclosed embodiment, conduits 66 each have a length of about 4.12 meters and an inner diameter of about 50.8 millimeters.

The second of manifolds 60 may attach to valve body 42 in a similar manner. Manifold 60 may attach to valve body 42 and may be in fluid communication with valve body 42 via a port (not shown) in valve body 42 that is aligned with opening 62. Opening 62 may be on a surface facing valve body 42. In this configuration, opening 62 may function as an inlet to receive fluid from valve body 42. Dual openings 64, positioned on an opposing surface oriented away from valve body 42, may each engage conduits 66 extending between valve body 42 and tank 28. In this configuration, dual openings 64 may function as outlets to discharge fluid into conduits 66. Opening 62 of manifold 60 may communicate with a port of valve body 42, and dual openings 64 may each engage conduits 66 at an end opposite manifold 60.

Manifold 60 may be fabricated from any suitable materials known in the art, including, for example, from a metallic material. In the disclosed embodiments, manifold 60 is fabricated from steel. Opening 62 may have an area greater than at least one of openings 64 and an area less than a sum of dual openings 64. In particular, opening 62 of each of manifolds 60 may be characterized by a diameter of about 65-75 millimeters and each of dual openings 64 may be characterized by a diameter of about 30-40 millimeters. In the disclosed embodiment, opening 62 is characterized by a diameter of about 69 millimeters and dual openings 64 are each characterized by a diameter of about 44 millimeters.

Figure 3:
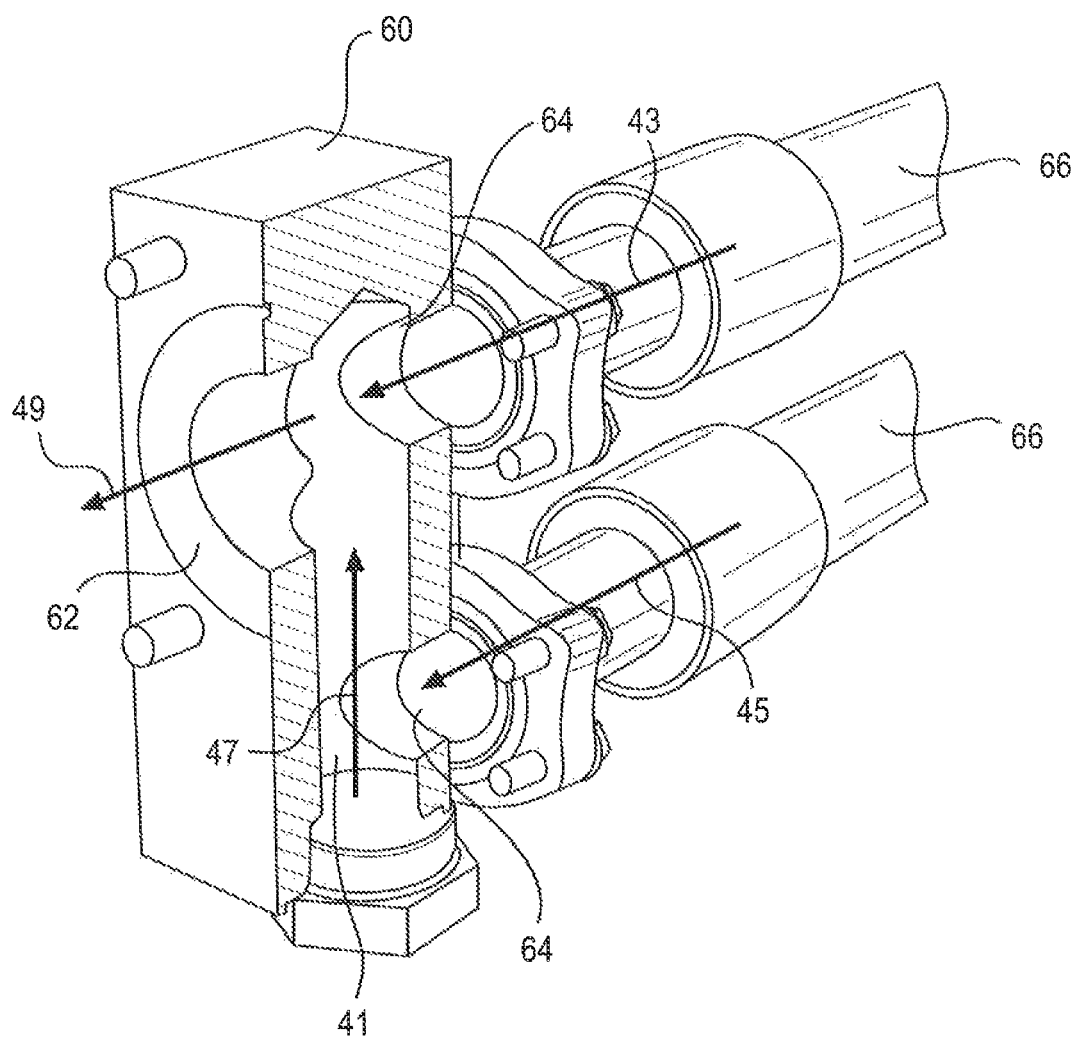
FIG. 3 is an enlarged cutaway view illustration of an exemplary disclosed manifold that may be used in conjunction with the hydraulic system of FIG. 2.

As illustrated in FIG. 3, each of manifolds 60 may be fabricated (e.g., drilled) to provide a passageway 41 for the flow of hydraulic fluid carried by each of conduits 66. In particular, flows 43, 45, each associated with one of conduits 66, may travel through passageway 41. As flows 43, 45 enter manifold 60, flow 45 may conform to passageway 41 by bending sharply at a generally orthogonal angle to a direction associated with flow 45, to become flow 47. The generally orthogonal angle may be characterized by a radius of curvature of about zero. Flows 43, 47 may subsequently intersect at generally orthogonal angles to each other at a point generally in alignment with opening 62, whereupon flows 43, 47 may converge into a single flow 49 traveling through opening 62. The generally orthogonal angle associated with the convergence of flows 43, 47 into single flow 49 may also be characterized by a sharp bend and a radius of curvature of about zero.

Manifolds 60, together with conduits 66, may provide a desired backpressure for hydraulic system 26. The amount of backpressure exhibited between valve body 42 and tank 28 along conduits 66 may be about 1,510 kilopascals for a given flow rate of about 4,500 liters per minute at an operating temperature of about 50-80° Celsius. In the disclosed embodiment, the operating temperature is about 60° Celsius and the hydraulic fluid is oil.

INDUSTRIAL APPLICABILITY

The disclosed hydraulic system may be used with any machine having a hydraulic actuator that may be vulnerable to the creation of internal air voids. This may occur, for example, under strenuous operating conditions in which the hydraulic actuator is connected to a tool that causes the hydraulic actuator to actuate faster than the rate at which hydraulic fluid can be supplied to the hydraulic actuator. The disclosed hydraulic system may reduce formation of air voids by generating a desired level of backpressure along the lengths of parallel return flow paths. Operation of hydraulic system 26 will now be discussed.

Machine 10 may be operated to perform tasks using work tool 18. In the disclosed embodiment, work tool 18 may be used to load and transfer earth materials onto a dump truck, for example. In particular, at the machine operator's command, work tool 18 may be lowered and raised in a series of rapid cycles that collect and transfer earth materials. Work tool 18 may be more efficient with increased cycles in a shorter amount of time. As work tool 18 is lowered, hydraulic actuators 20a-c may rapidly discharge large volumes of hydraulic fluid into valve body 42 for return to tank 28.

Valve body 42 may receive hydraulic fluid from one of the head- or rod-end chambers of hydraulic actuators 20a-c and direct the hydraulic fluid to tank 28 via manifolds 60 and conduits 66. In particular, the hydraulic fluid may exit valve body 42 and enter manifold 60 as single flow 49 through opening 62 of manifold 60. Manifold 60 may split the hydraulic fluid into two flows 43, 45 exiting manifold 60 through dual openings 64 and carried by conduits 66. Conduits 66 may carry the hydraulic fluid to manifold 60 associated with tank 28 at an opposite end of hydraulic system 26. Manifold 60 at tank 28 may convert the two flows 43, 45 carried by conduits 66 and entering dual openings 64 of manifold 60 into single flow 49 that is delivered to tank 28 via single opening 62.

The splitting of hydraulic fluid into two flows 43, 45 and convergence back into single flow 49 via manifolds 60 and dual conduits 66 may help to increase the overall drag on the flow through hydraulic system 26. The increased drag may provide a desired backpressure of hydraulic system 26 to help reduce an amount of air voids in hydraulic actuators 20a-c by redirecting hydraulic fluid received from one of the head- or rod-end chambers to the other of the head- or rod-end chambers containing air voids.

In addition to providing the desired backpressure, the use of dual conduits 66 (as opposed to a single conduit) may permit the use of less expensive supplies of greater durability. This may be due to lower costs being associated with two conduits having a smaller diameter (e.g., dual conduits 66) as compared to greater costs being associated with a single conduit having a larger diameter. In addition, a single conduit with a larger diameter may be more difficult to produce, thereby increasing the possibility of error that may result in failure.

By converging dual flows 43, 45 associated with each of conduits 66 into single flow 49, manifold 60 may help promote a more uniform temperature of the hydraulic fluid entering tank 28. This may occur as a result of the mixing that occurs when dual flows 43, 45 entering manifold 60 via dual openings 64 are converged into single flow 49 that exits manifold 60 through opening 62 and into tank 28.

Manifolds 60 may also function as a heat sink and promote heat dissipation by cooling the hydraulic fluid passing through manifolds 60. In particular, because flows 43, 45 may mix in a turbulent manner during travel through manifolds 60, the passage of hydraulic fluid through openings 62, 64 may promote heat transfer through convection. Additionally, because manifolds 60 may be fabricated from a metallic material, heat may also transfer through conduction.

An additional benefit of the disclosed hydraulic system may be improved energy dissipation. In particular, because the drag on the flow through hydraulic system 26 may be distributed over a distance between manifolds 60, there may be a gradual drop in backpressure exhibited between valve body 42 and tank 28 along conduits 66. This may result in a gradual dissipation of heat across hydraulic system 26 and a reduction in local heating. By distributing the energy dissipation along conduits 66, thermal cycling extremes may be avoided for materials mated together with dissimilar rates of thermal expansion, thereby helping to reduce the possibility of extreme expansions and contractions at different rates.

It will be apparent to those skilled in the art that various modifications and variations can be made to the disclosed hydraulic system without departing from the scope of the disclosure. Other embodiments of the hydraulic system will be apparent to those skilled in the art from consideration of the specification and practice of the hydraulic system disclosed herein. It is intended that the specification and examples be considered as exemplary only, with a true scope of the disclosure being indicated by the following claims and their equivalents.

What is claimed is:

1. A hydraulic system, comprising:
   a fluid tank;
   a first manifold operatively attached to the fluid tank and having at least two inlets lying on a planar surface and at least one outlet in fluid communication with the fluid tank, the number of the at least one outlet being less than the number of the at least two inlets;
   a valve body;
   a second manifold operatively attached to the valve body, the second manifold having at least one inlet in fluid communication with the valve body and at least two outlets, the number of the at least one inlet being less than the number of the at least two outlets; and
   a plurality of conduits fluidly connecting the at least two inlets of the first manifold and the at least two outlets of the second manifold.

2. The hydraulic system of claim 1, wherein:
   the first manifold includes the planar surface and an opposing second surface; and the at least one outlet is located in the second surface.

3. The hydraulic system of claim 2, wherein:
   at least one of the at least two inlets of the first manifold is generally in alignment with another of the at least two inlets along a length direction of the first manifold; and
   the at least one outlet of the first manifold is generally concentric with one of the at least two inlets of the first manifold.

4. The hydraulic system of claim 3, wherein an area of the at least one outlet of the first manifold is greater than an area of at least one of the at least two inlets.

5. The hydraulic system of claim 4, wherein an area of the at least one outlet of the first manifold is less than a sum of areas of the at least two inlets.

6. The hydraulic system of claim 3, wherein:
   the at least one outlet has a diameter of about 65-75 square millimeters; and
   each of the at least two inlets has a diameter of about 30-40 square millimeters.

7. The hydraulic system of claim 1, wherein:
   each of the plurality of conduits is substantially identical; and
   each of the plurality of conduits has a length of about 4-4.5 meters.

8. The hydraulic system of claim 7, wherein each of the plurality of conduits has an inner diameter of about 49-52 millimeters.

9. The hydraulic system of claim 1, further including:
   a plurality of hydraulic actuators; and
   a plurality of valves associated with the valve body, each of the plurality of valves corresponding to one of the plurality of hydraulic actuators.

10. The hydraulic system of claim 1, wherein the first manifold includes a passageway joining flows associated with the at least two inlets and the at least one outlet.

11. The hydraulic system of claim 10, wherein:
    the passageway includes a first flow passageway and a second flow passageway; and
    the first flow passageway and the second flow passageway intersect at a generally orthogonal angle.

12. The hydraulic system of claim 11, wherein the first manifold, the second manifold, and the plurality of conduits provide the hydraulic system with a backpressure of about 1,510 kilopascals for a flow rate of about 4,500 liters per minute at an operating temperature of about 50-80° Celsius.

13. The hydraulic system of claim 1, wherein the first manifold is fabricated from a metallic material.

14. A method for creating backpressure for a hydraulic system, comprising:
    drawing fluid from a fluid tank;
    pressurizing the fluid;
    directing the pressurized fluid through a valve body to a hydraulic actuator;
    directing at least one flow of the pressurized fluid from the valve body into a first manifold;
    splitting the pressurized fluid into at least two flows exiting from a planar surface of the first manifold;
    combining the at least two flows into at least one flow in a second manifold; and directing the at least one flow of the second manifold into the fluid tank.

15. The method of claim 14, further including generating a backpressure of about 1,510 kilopascals for a flow rate of about 4,500 liters per minute at an operating temperature of about 50-80° Celsius.

16. The method of claim 14, wherein combining the at least two flows into at least one flow in the second manifold includes causing at least one of the at least two flows to enter the second manifold in a position generally in alignment with another of the at least two flows.

17. The method of claim 16, wherein combining the at least two flows into at least one flow in the second manifold includes causing the at least two flows to intersect at a generally orthogonal angle.

18. The method of claim 17, wherein directing the at least one flow of the second manifold into the fluid tank includes reducing the temperature of the at least one flow of the second manifold relative to the at least two flows.

19. The method of claim 14, wherein splitting the pressurized fluid into at least two flows in the first manifold and combining the at least two flows into at least one flow in the second manifold results in a gradual dissipation of heat across an associated hydraulic system.

20. A hydraulic system, comprising:
    a fluid tank;
    a first manifold operatively attached to the fluid tank and having at least one outlet in fluid communication with the fluid tank and at least two inlets lying on a planar surface of the first manifold;
    a valve body;
    a second manifold operatively attached to the valve body, the second manifold having at least one inlet in fluid communication with the valve body and at least two outlets lying on a planar surface of the second manifold, the number of the at least one inlet being less than the number of the at least two outlets; and
    a plurality of conduits fluidly connecting the at least two inlets of the first manifold and the at least two outlets of the second manifold, the first and second manifolds and the plurality of conduits providing the hydraulic system with a backpressure of about 1,510 kilopascals at a flow rate of about 4,500 liters per minute.

* * * * *